United States Patent [19]

Shirahata et al.

[11] Patent Number: 4,474,832
[45] Date of Patent: Oct. 2, 1984

[54] MAGNETIC RECORDING MEDIA

[75] Inventors: Ryuji Shirahata; Masaru Sekine; Noburo Hibino, all of Kanagawa, Japan

[73] Assignee: Fuji Photo Film Company Limited, Kanagawa, Japan

[21] Appl. No.: 475,827

[22] Filed: Mar. 16, 1983

[30] Foreign Application Priority Data

Mar. 16, 1982 [JP] Japan .................................. 57-41039

[51] Int. Cl.$^3$ .............................................. H01F 10/02
[52] U.S. Cl. .................................... 427/130; 427/132; 427/251
[58] Field of Search ................................ 427/127–132, 427/48, 251

[56] References Cited

U.S. PATENT DOCUMENTS 3,342,633  9/1967  Bate et al. ......................... 117/217

Primary Examiner—Bernard D. Pianalto
Attorney, Agent, or Firm—Sughrue, Mion, Zinn, Macpeak, and Seas

[57] ABSTRACT

A method for preparing a magnetic recording medium is disclosed. The method involves forming a thin magnetic layer on a polyester film by means of a vapor deposition or plating method, continually moving the film while maintaining it at a tension of 400 g/mm$^2$ or less and contacting the moving film with a heating device at a temperature within the range of 70° to 200° C. for a period of time within the range of 0.1 to 30 seconds. The method provides a non-binder type magnetic recording medium having improved skew characteristics without formation of curls.

8 Claims, 1 Drawing Figure

U.S. Patent
Oct. 2, 1984
4,474,832
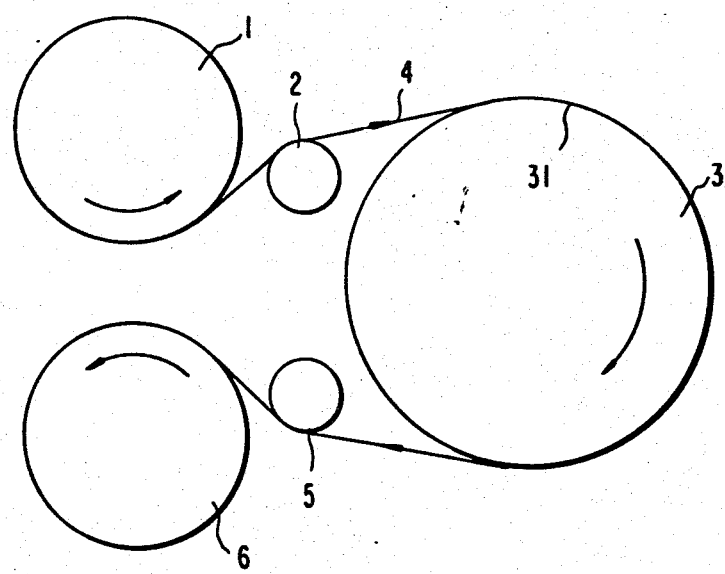

MAGNETIC RECORDING MEDIA

FIELD OF THE INVENTION

This invention relates to a method for preparing magnetic recording media which comprises forming a magnetic thin layer on a plastic thin film by an evaporation, an ion plating or a sputtering method. More particularly, the invention relates to a method for preparing metallic thin layer type magnetic recording media having improved shape and skew property.

BACKGROUND OF THE INVENTION

A coating type magnetic recording medium which is prepared by dispersing a magnetic oxide powder such as $\gamma$-$Fe_2O_3$, Co-doped $\gamma$-$Fe_2O_3$, $Fe_3O_4$, Co-doped $Fe_3O_4$, a berthollide compound of $\gamma$-$Fe_2O_3$ and $Fe_3O_4$, Co-doped berthollide compound of $\gamma$-$Fe_2O_3$ and $Fe_3O_4$, Co-doped berthollide compound and $CrO_2$ or an alloy magnetic powder mainly composed of Fe, Co or Ni in an organic binder such as vinyl chloride-vinyl acetate copolymer, styrene-butadiene copolymer, epoxy resin or polyurethane resin, coating and drying it has been widely used.

There has been an increase in the demand for high density recording. Accordingly, attention has been given to so-called non-binder type magnetic recording media using a ferromagnetic thin metallic layer formed by a vacuum evaporation method, a sputtering method or an ion plating method without a binder. Various attempts have been made to produce this type of recording media.

It is desirable for a magnetic recording medium which comprises providing a ferromagnetic metallic thin layer on a plastic film such as a polyester film to be capable of higher density recording. Accordingly, skew caused by a dimensional change of the magnetic recording medium must be substantially prevented. However, present non-binder type magnetic recording media have not been able to eliminate enough of the skew.

When a metallic thin layer is provided on a plastic film such as a polyester film, curing of the magnetic recording medium readily occurs. This causes running problems or causes an intermittent contact with the magnetic head in the magnetic recording device. A heat treatment as disclosed in Japanese Patent Publication No. 12420/60 is conducted to remove the above referred to curling. However, the heat treatment is not capable of improving skew in the magnetic recording medium having a ferromagnetic metallic thin layer prepared by a vapour deposition method or a plating method.

SUMMARY OF THE INVENTION

As the results of various investigations, the inventors have found a method for preparing a non-binder type magnetic recording medium to improve the skew characteristic and to remove the curling. The method of the invention is markedly effective and practical with respect to the preparation of non-binder type magnetic recording media.

That is, the invention relates to a method for preparing magnetic recording media which comprises forming a magnetic thin layer on a polyester film by an vapour deposition method or a plating method, contacting the film with a heating device at 70° to 200° C. for 0.1 to 30 seconds, while moving the film and maintaining a tension of not more than 400 g/mm².

BRIEF DESCRIPTION OF THE DRAWINGS

The FIGURE is a schematic view of a device used in the preparation of a magnetic recording medium of the present invention.

DETAILED DESCRIPTION OF THE PREFERRED EMBODIMENTS

In the disclosure, "tension" is a property which can be measured by the strength loaded on a sectional area of a polyester film which is provided with a magnetic thin layer, and if necessary, a protective layer, a subbing layer or a backing layer. The media should have not more than 400 g/mm² of tension in order to improve the skew characteristic. A minimum limit of tension is determined only by what is required to allow handling, and is generally 40 g/mm² or more. The temperature of the heating device used to contact the film should not be lower than 70° C. in order to obtain skew improvement and curling removal and should be not higher than 200° C. in light of a film deformation caused by heating. For the purpose of the invention, the temperature is particularly preferably within the range of from 80° to 150° C. The contact time between the film and the heating device is preferably not lower than 0.1 second in order to obtain curling removal and is preferably not more than 30 seconds in view of possible film deformation caused by heating. The contact time is more preferably within the range of from 0.5 to 20 seconds.

The FIGURE is a shematical view showing an embodiment of an apparatus for carrying out the method of the invention. A magnetic tape having a magnetic thin layer formed by a vapour deposition method or a plating method is guided from an outlet for sending portion 1 to a heated drum 3 through a guide roller 2. A surface 31 of the heated drum 3 which is kept at a predetermined temperature, and a magnetic tape 4 which is travelling in contact with the surface of the drum is subjected to heat treatment by the drum 3. After passing the heated drum 3, the tape 4 passes through a guide roll 5 and is wound up in winding portion 6. If necessary, an expander roll can be provided before the tape passes the heated drum 3 or is wound up in the winding portion 6. The surface 31 of the heated drum can be contacted with the surface of tape on which the magnetic thin layer is formed or the back surface of the tape. However, the heated drum is preferably contacted with the back surface, because where a protective treatment is not provided, a magnetic thin layer is readily damaged with the contact of the heated drum. The time of the contact between the tape 4 and the drum surface 31 varies depending upon the travelling speed of the tape 4 and a wrapping angle of the tape 4 toward the heated drum 3.

In accordance with the vapour deposition method of the invention a substance or a compound is converted to a vapour or an ionized vapour in air or in vacuum. The vapour then forms a thin layer on a support. Useful methods include a vacuum evaporation method, a sputtering method, an ion plating method, an ion beam depsotion method and a chemical vapour deposition method.

In accordance with the plating method a substance is extracted on a support as a thin layer from a liquid phase. Useful methods include an electric plating method and a non-electrolysis plating method.

The ferromagnetic metal thin layer, which is the magnetic recording layer of the invention, may be comprised of iron, cobalt, nickel, other ferromagnetic metal or a ferromagnetic alloy such as Fe—Co, Fe—Ni, Co—Ni, Fe—Co—Ni, Fe—Si, Fe—Rh, Co—P, Co—B, Co—Si, Co—V, Co—Y, Co—La, Co—Ce, Co—Pr, Co—Sm, Co—Pt, Co—Mn, Co—Mg, Co—Ni—P, Co—Ni—O, Co—Ni—B, Co—Ni—Ag, Co—Ni—Cu, Co—Cr, Co—Ni—Cr, Co—Ni—Zn, Co—Ni—Zr, Co—Ni—W, Co—Ni—Be and Co—Ni—Re. The ferromagnetic metal thin layer generally has a thickness of 0.02 $\mu$m to 5 $\mu$m and preferably 0.05 $\mu$m to 1 $\mu$m.

A method for preparing a magnetic layer such as a vapour deposition method or a plating method is, for example, disclosed in L. Holland, "Vacuum Deposition of Thin Films" (Chapman & Hall Ltd., 1956); L. I. Maissel & R. Gland, "Handbook of Thin Film Technology" (McGraw-Hill Co., 1970); W. Goldie, "Metallic Coating of Plastics" (Electrochemical Publications, 1968); F. A. Lowenheim "Modern Electroplating" (John Wiley & Sons. Inc., 1974).

The invention will be explained in more detail by the following examples but it is not limited thereto.

EXAMPLE 1

On a polyethylene terephthalate film having a thickness of 15 $\mu$m and a width of 500 mm, a cobalt magnetic layer having a thickness of 0.12 $\mu$m was prepared by a diagnostic evaporation method to obtain an orginal magnetic recording tape. Cobalt having 99.95% purity was charged in an electron beam evaporation source as an evaporation source and was diagnostically evaporated on a film under vacuum of $5 \times 10^{-5}$ Torr so that vapour of cobalt was introduced at the incidence angle of 70° to 90°. The magnetic recording tape was subjected to heat treatment for two seconds under various conditions using an apparatus as shown in the FIGURE, and slit to a width of ¼ inch to prepare samples of magnetic recording tape. The skew of the magnetic recording tape was measured in the following manner and the results are shown in Table 1. After images were recorded by a VHS type VTR at 25° C. and 70%RH (relative humidity), the magnetic recording tape was kept for 48 hours at 70° C. under a dry condition. The tape was then used to reproduce images at 25° C. and 70%RH, and the skew was measured.

TABLE 1

| Surface temperature of heated drum (°C.) | Tension at heat treatment (g/mm$^2$) | Skew ($\mu$ sec) | Curling state of tape |
|---|---|---|---|
| 50 | 100 | 25 | Large curling on the magnetic layer side |
|  | 250 | 36 |  |
|  | 400 | 55 |  |
|  | 500 | 65 |  |
| 70 | 100 | 5 | Practically no serious curling |
|  | 250 | 10 |  |
|  | 400 | 14 |  |
|  | 500 | 38 |  |
| 110 | 100 | 5 | Practically no serious curling |
|  | 250 | 10 |  |
|  | 400 | 12 |  |
|  | 500 | 35 |  |
| 160 | 100 | 4 | Practically no serious curling |
|  | 250 | 10 |  |
|  | 400 | 12 |  |
|  | 500 | 33 |  |
| 200 | 100 | 4 | Practically no serious curling |
|  | 250 | 10 |  |
|  | 400 | 12 |  |

TABLE 1-continued

| Surface temperature of heated drum (°C.) | Tension at heat treatment (g/mm$^2$) | Skew ($\mu$ sec) | Curling state of tape |
|---|---|---|---|
|  | 500 | 30 | Curling on the back surface side |
| 230 | 100 | 4 | Large curling on the back surface side with thermal deformation of the tape |
|  | 250 | 10 |  |
|  | 400 | 11 |  |
|  | 500 | 30 |  |

Further, magnetic recording tapes were prepared in the same manenr as above except that the heat treatments were performed for vaious periods of time at the surface temperatures of the heated drum of 70° C. and 200° C. and the tensions of 100 g/mm$^2$ and 400 g/mm$^2$. As a result, it was clear that curling was not completely removed with the heat treatment for less than 0.1 second and curling in the opposite direction was formed with the heat treatment for more than 30 seconds and that accordingly, both of the above periods were not acceptable from the practical point of view.

EXAMPLE 2

Non-electrolysis plating was carried out to prepare a Co—P (Co: 98%, P: 2%) magnetic layer having a thickness of 0.2 $\mu$m on a polyethylene terephthalate film having a thickness of 12 $\mu$m and a width of 300 mm using the following plating composition and under the following plating condition. On a surface of the polyethylene terephthalate film, Pd was formed having an average thickness of 80 Å by sputtering as an activation of pretreatment for the non-electrolysis plating.

| Plating composition: | |
|---|---|
| Cobalt chloride (CoCl$_2$—6H$_2$O) | 9.5 g/l |
| Sodium hypophosphite (NaH$_2$PO$_2$.H$_2$O) | 5.3 g/l |
| Ammonium chloride | 10.7 g/l |
| Citric acid | 26.5 g/l |
| Boric acid | 30.9 g/l |
| Plating conditions: pH: 7.5, liquid temperature: 80° C. | |

Thus a magnetic recording layer having a coercivity of 600 Oe and a squareness ratio of 0.72 was prepared by the plating. After the heat treatment was carried out for 5 seconds using the device as shown in the FIGURE under the various conditions, the original magnetic recording layer was slit to a width of ¼ inch to prepare magnetic recording tape. The skew and the curling state of the magnetic recording tape were measured in the same manner as in Example 1 and the results are shown in Table 2.

TABLE 2

| Surface temperature of heated drum (°C.) | Tension at heat treatment (g/mm$^2$) | Skew ($\mu$ sec) | Curling state of tape |
|---|---|---|---|
| 40 | 70 | 35 | Large curling on the magnetic layer side |
|  | 260 | 38 |  |
|  | 400 | 54 |  |
|  | 550 | 66 |  |
| 70 | 70 | 8 | Practically no serious curling |
|  | 260 | 9 |  |
|  | 400 | 12 |  |
|  | 550 | 37 |  |
| 135 | 70 | 4 | Practically no serious curling |
|  | 260 | 7 |  |

TABLE 2-continued

| Surface temperature of heated drum (°C.) | Tension at heat treatment (g/mm²) | Skew (μ sec) | Curling state of tape |
|---|---|---|---|
| | 400 | 10 | |
| | 550 | 35 | |
| 200 | 70 | 3 | Practically no serious curling |
| | 260 | 8 | |
| | 400 | 11 | |
| | 550 | 32 | Curling on the back surface side |
| 280 | 70 | 3 | Large curling on the back surface side |
| | 260 | 9 | |
| | 400 | 12 | |
| | 550 | 32 | |

Further, magnetic recording tapes were prepared in the same manner as above except that the heat treatment were performed for varous periods of time at the surface temperatures of the heated drum of 70° C. and 200° C. and the tensions of 70 g/mm² and 400 g/mm². As a result, it was clear that with the heat treatment period of less than 0.1 second, curling was not completely removed and that with the heat treatment period of more than 30 seconds, curling in the reverse direction occurred and is not acceptable from the practical point of view.

From the above examples it is apparent that a magnetic recording medium which comprises forming a magnetic thin layer on a polyester film by a vapour deposition or a plating method, contacting said film with a heating device at 70° to 200° C. for 0.1 to 30 seconds, while moving the film with tension of not more than 400 g/mm² is an improved medium with regard to the removal of curling and less skew.

While the invention has been described in detail and with reference to specific embodiment thereof, it will be apparent to one skilled in the art that various changes and modifications can be made therein without departing from the spirit and scope thereof.

What is claimed is:

1. A method for preparing a magnetic recording medium, comprising the steps of:
   forming a magnetic thin layer on a polyester film support base;
   moving the film having the magnetic thin layer thereon while maintaining the film at a tension of from 40–400 g/mm²; and
   contacting the moving film with a heating device maintained at a temperature within the range of 70° to 200° C. for a period of time within the range of 0.1 to 30 seconds.

2. A method for preparing a magnetic recording medium as claimed in claim 1, wherein the magnetic thin layer is formed on the polyester film support base by vapour deposition.

3. A method for preparing a magnetic recording medium as claimed in claim 1, wherein the magnetic thin film is formed on the polyester film support base by a plating method.

4. A method for preparing a magnetic recording medium as claimed in claim 1, wherein the temperature of the heating device is 80° to 150° C.

5. A method for preparing a magnetic recording medium as claimed in claim 1, wherein the moving film is contacted with the heating device for 0.5 to 20 seconds.

6. A method for preparing a magnetic recording medium as claimed in claim 1, wherein the magnetic thin layer has a thickness within the range of 0.02 μm to 5 μm.

7. A method for preparing a magnetic recording medium as claimed in claim 6, wherein the magnetic thin film has a thickness within the range of 0.05 μm to 1 μm.

8. A method for preparing a magnetic recording medium as claimed in claim 1, wherein the tension is from 70 to 400 g/mm².

* * * * *